US008868906B2

(12) United States Patent
Aaron et al.

(10) Patent No.: US 8,868,906 B2
(45) Date of Patent: *Oct. 21, 2014

(54) SIGNATURE SPECIFICATION FOR ENCRYPTED PACKET STREAMS

(71) Applicant: AT&T Intellectual Property I, L.P., Reno, NV (US)

(72) Inventors: Jeffrey A. Aaron, Atlanta, GA (US); Edgar Vaughan Shrum, Jr., Smyrna, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/681,066

(22) Filed: Nov. 19, 2012

(65) Prior Publication Data

US 2013/0080786 A1    Mar. 28, 2013

Related U.S. Application Data

(63) Continuation of application No. 12/268,236, filed on Nov. 10, 2008, now Pat. No. 8,316,231, and a continuation of application No. 10/943,588, filed on Sep. 17, 2004, now Pat. No. 7,451,309.

(51) Int. Cl.
*H04L 29/06* (2006.01)
*H04L 9/28* (2006.01)

(52) U.S. Cl.
CPC *H04L 9/28* (2013.01); *H04L 63/12* (2013.01); *H04L 63/0428* (2013.01)
USPC ............ 713/160; 380/201; 380/240; 380/241

(58) Field of Classification Search
CPC ................. G11B 20/00579; G11B 20/10222; G11B 20/10287; H04L 1/0009; H04L 1/0031; H04L 1/1664; H04L 1/0006; H04L 1/0011; H04L 1/0083; H04L 1/0084; H04L 9/0606; H04L 63/1425
USPC ........................... 380/201, 240, 241; 713/160
See application file for complete search history.

(56) References Cited

U.S. PATENT DOCUMENTS

| | | | |
|---|---|---|---|
| 3,646,517 A | 2/1972 | Waters et al. | 714/811 |
| 5,706,406 A | 1/1998 | Pollock | 706/51 |
| 6,522,658 B1 | 2/2003 | Roccanova | |
| 6,529,499 B1 | 3/2003 | Doshl et al. | |
| 6,640,248 B1 | 10/2003 | Jorgensen | |
| 6,651,099 B1 | 11/2003 | Dietz et al. | |
| 6,665,725 B1 | 12/2003 | Dietz et al. | |
| 6,771,646 B1 | 8/2004 | Sarkissian et al. | 370/392 |
| 6,789,116 B1 | 9/2004 | Sarkissian et al. | 709/224 |
| 6,954,789 B2 | 10/2005 | Dietz et al. | 709/224 |
| 6,961,331 B2 | 11/2005 | Tokunaga et al. | 370/352 |
| 6,973,033 B1 | 12/2005 | Chiu et al. | 370/230.1 |
| 6,975,592 B1 | 12/2005 | Seddigh et al. | 370/230 |
| 7,010,687 B2 | 3/2006 | Ichimura | 713/167 |

(Continued)

*Primary Examiner* — Eleni Shiferaw
*Assistant Examiner* — Paul Callahan
(74) *Attorney, Agent, or Firm* — Myers Bigel Sibley & Sajovec, PA

(57) ABSTRACT

Methods, systems, and products are disclosed for specifying a signature for an encrypted packet stream. One method receives the encrypted stream of packets, and encryption obscures the contents of a packet. A signature for insertion into the stream of packets is specified, and the signature identifies a type of data encrypted within the stream of packets. The signature identifies the contents of the packet despite the encryption obscuring the contents.

16 Claims, 13 Drawing Sheets

(56) References Cited

U.S. PATENT DOCUMENTS

| | | | |
|---|---|---|---|
| 7,035,289 B2 | 4/2006 | Devine et al. | 370/493 |
| 7,215,637 B1 | 5/2007 | Ferguson et al. | 370/230.1 |
| 7,216,230 B2 | 5/2007 | Suzuki et al. | 713/170 |
| 7,225,271 B1 | 5/2007 | DiBiasio et al. | 709/240 |
| 7,246,245 B2 | 7/2007 | Twomey | 713/189 |
| 7,286,667 B1 | 10/2007 | Ryal | 380/200 |
| 7,289,480 B2 | 10/2007 | Lundstrom et al. | 370/338 |
| 7,290,028 B2 | 10/2007 | Brabson et al. | 709/203 |
| 7,299,282 B2 | 11/2007 | Sarkissian et al. | 709/224 |
| 7,310,423 B2 | 12/2007 | Hobrock et al. | 380/241 |
| 7,336,787 B2 | 2/2008 | Unger et al. | 380/217 |
| 7,359,979 B2 | 4/2008 | Gentle et al. | 709/231 |
| 7,385,924 B1 | 6/2008 | Riddle | 370/235 |
| 7,447,313 B2 | 11/2008 | Van Rijnsoever | 380/207 |
| 7,451,309 B2 | 11/2008 | Aaron et al. | 713/160 |
| 7,562,213 B1 | 7/2009 | Timms | 713/160 |
| 7,564,872 B1 | 7/2009 | Chawla et al. | 370/468 |
| 2001/0023484 A1 | 9/2001 | Ichimura | 713/193 |
| 2002/0027923 A1 | 3/2002 | Tokunaga et al. | 370/401 |
| 2002/0035639 A1 | 3/2002 | Xu | |
| 2002/0059170 A1 | 5/2002 | Vange | |
| 2002/0075805 A1 | 6/2002 | Gupta et al. | 370/235 |
| 2002/0075875 A1 | 6/2002 | Dravida et al. | 370/395.21 |
| 2002/0094081 A1 | 7/2002 | Medvinsky | 380/44 |
| 2002/0095577 A1 | 7/2002 | Nakamura et al. | 713/176 |
| 2002/0105911 A1 | 8/2002 | Pruthi et al. | 370/241 |
| 2003/0016770 A1 | 1/2003 | Trans | |
| 2003/0021296 A1 | 1/2003 | Wee et al. | 370/474 |
| 2003/0023846 A1 | 1/2003 | Krishna et al. | 713/162 |
| 2003/0043801 A1 | 3/2003 | Seko | 370/389 |
| 2003/0068040 A1 | 4/2003 | Wee et al. | 380/200 |
| 2003/0086411 A1 | 5/2003 | Vassilovski | |
| 2003/0086515 A1 | 5/2003 | Trans | |
| 2003/0093563 A1 | 5/2003 | Young et al. | |
| 2003/0097595 A1 | 5/2003 | Partridge et al. | 713/201 |
| 2003/0131228 A1 | 7/2003 | Twomey | |
| 2003/0167394 A1 | 9/2003 | Suzuki et al. | |
| 2003/0225549 A1 | 12/2003 | Shay et al. | |
| 2003/0227907 A1 | 12/2003 | Choi et al. | |
| 2003/0231767 A1 | 12/2003 | Carbajal | |
| 2003/0235209 A1 | 12/2003 | Garg | |
| 2004/0003070 A1 | 1/2004 | Fernald et al. | |
| 2004/0008724 A1 | 1/2004 | Devine et al. | |
| 2004/0057437 A1 | 3/2004 | Daniel et al. | |
| 2004/0059935 A1 | 3/2004 | Cousins | 713/200 |
| 2004/0068668 A1 | 4/2004 | Lor et al. | |
| 2004/0071130 A1 | 4/2004 | Doerr et al. | |
| 2004/0083299 A1 | 4/2004 | Dietz et al. | |
| 2004/0090937 A1 | 5/2004 | Chaskar | |
| 2004/0090943 A1 | 5/2004 | daCosta | |
| 2004/0090989 A1 | 5/2004 | Kobayashi | |
| 2004/0109414 A1 | 6/2004 | Choi et al. | |
| 2004/0142697 A1 | 7/2004 | Knaebchen et al. | 455/452.1 |
| 2004/0199630 A1 | 10/2004 | Sarkissian et al. | 709/224 |
| 2004/0208120 A1 | 10/2004 | Shenoi | 370/229 |
| 2004/0215955 A1 | 10/2004 | Tamai et al. | 713/150 |
| 2004/0234056 A1 | 11/2004 | Heilmann et al. | 379/196 |
| 2004/0247122 A1 | 12/2004 | Hobrock et al. | 380/241 |
| 2004/0258090 A1 | 12/2004 | Sharafeddine et al. | 370/468 |
| 2004/0260829 A1 | 12/2004 | Husak et al. | 709/232 |
| 2005/0052996 A1 | 3/2005 | Houck et al. | 370/230 |
| 2005/0060539 A1 | 3/2005 | Anspach | 713/160 |
| 2005/0060543 A1 | 3/2005 | Anspach | 713/165 |
| 2005/0120208 A1 | 6/2005 | Albert Dobson | 713/160 |
| 2005/0152378 A1 | 7/2005 | Bango et al. | |
| 2005/0169253 A1 | 8/2005 | Hu | |
| 2006/0031374 A1 | 2/2006 | Lu et al. | 709/207 |
| 2006/0064579 A1 | 3/2006 | Aaron et al. | 713/150 |
| 2006/0064746 A1 | 3/2006 | Aaron et al. | 726/13 |
| 2006/0064747 A1 | 3/2006 | Aaron et al. | 726/13 |
| 2006/0064748 A1 | 3/2006 | Aaron et al. | 726/13 |
| 2006/0064749 A1 | 3/2006 | Aaron et al. | 726/13 |
| 2006/0068040 A1 | 3/2006 | Nair | 424/742 |
| 2006/0072464 A1 | 4/2006 | Aaron et al. | 370/241 |
| 2006/0184961 A1 | 8/2006 | Lee | |
| 2006/0233362 A1 | 10/2006 | Deans et al. | 380/42 |
| 2006/0245589 A1 | 11/2006 | Pinder | 380/42 |
| 2007/0060166 A1 | 3/2007 | Kitamura et al. | 455/450 |
| 2007/0288630 A1 | 12/2007 | De Noia et al. | |

SIGNATURE SPECIFICATION FOR ENCRYPTED PACKET STREAMS

CROSS REFERENCE TO RELATED APPLICATION

This application is a continuation of U.S. patent application Ser. No. 12/268,236, filed Nov. 10, 2008 (now U.S. Pat. No. 8,316,231), which is a continuation of U.S. patent application Ser. No. 10/943,588, filed Sep. 17, 2004, (now U.S. Pat. No. 7,451,309), the disclosures of which are hereby incorporated herein by reference as if set forth in their entirety.

FIELD OF THE INVENTION

The present invention relates to the field of data processing.

BACKGROUND OF THE INVENTION

This application generally relates to communications and, more particularly, to detecting encrypted path finding or routing a message with an address header.

Encryption of communications is increasing. More and more people, businesses, and governments are encrypting their electronic communications. This encryption provides enhanced security and privacy for these electronic communications.

Encryption, however, is a problem for communications service providers. Communications service providers need to know the type of data contained within an electronic communication. Some data types receive priority processing, while other data types are queued for later processing. Encryption, however, hides the contents of the communication and often prevents a communications service provider from determining the level of required processing. Because the communications service provider cannot determine the level of required processing, the encrypted communication defaults to lesser priority and/or processing.

Internet telephony provides an example. Internet telephone calls should be processed to result in a real time, or nearly real time, conversation. If packets are lost, or if packets experience congestion, the quality of the call suffers. Internet telephone calls, then, should receive priority processing. When a communications service provider detects data representing an Internet telephone call, the service provider gives that data priority/special processing to reduce packet loss and to reduce latency effects. Encryption, however, hides the contents of the communication. Encryption prevents the communications service provider from determining whether priority and/or special processing is required. So, even though the communication is an Internet telephone call, encryption causes the communication to default to lesser priority and/or processing. The quality of the call may then suffer from packet loss and congestion.

There is, accordingly, a need in the art for improved determination of data types. When parties encrypt their communications, there is a need for determining the type of data contained inside the encrypted communication. There is also a need for identifying a particular kind of encrypted traffic in order to provide prioritized/specialized processing.

SUMMARY OF THE INVENTION

The aforementioned problems, and other problems, are reduced, according to exemplary embodiments, using methods, computer systems, computer programs, and computer program products that detect the type of data contained within an encrypted stream of packets. According to exemplary embodiments, the existence of one or more parameters of the encrypted stream of packets is noted. The one or more parameters are observable, despite encryption obscuring the contents of the encrypted stream of packets. The observable parameters are then used to infer the type of data contained within the encrypted stream of packets. An inference is then made whether the encrypted stream of packets contains, for example, video data, picture data, text data, and/or or voice data. Because the type of data may be inferred, the encrypted stream of packets may be processed to achieve objectives and goals. That is, even though the contents of the packets are hidden by encryption, this invention can still identify the type of date contained within the packets. The inferred type of data may then be used to determine if additional processing is required.

The exemplary embodiments also specify a signature. Once the type of data is inferred, the exemplary embodiments then specify what signature should be used to identify the type of data encrypted within the stream of packets. The signature identifies the contents of a packet and/or the stream despite the encryption obscuring the contents. The signature may then be inserted into the stream of packets so that downstream processes can more easily identify the contents and apply content-specific processing. The signature may also be communicated to other communications devices for self-identifying, or marking, communications. The signature may utilize specific known values of one or more of the observable parameters to artificially provide those known values for subsequent detection.

According to exemplary embodiments, the encrypted stream of packets is received, and encryption obscures the contents of a packet. A signature for insertion into the stream of packets is specified, and the signature identifies a type of data encrypted within the stream of packets. The signature identifies the contents of the packet despite the encryption obscuring the contents.

According to other embodiments, a signature may be specified for an encrypted Voice Over Internet Protocol stream of packets. The encrypted stream of packets is received and an observable parameter is noted. The parameter is observable despite encryption obscuring the contents of the encrypted stream of packets. The observable parameter is compared to a threshold value or value range. The presence of Voice Over Internet Protocol data, or data associated with another application/service type or specific application/service or specific software/system, within the encrypted stream of packets is inferred from the observable parameter. A signature for insertion into the stream of packets is then specified, and the signature identifies the Voice Over Internet Protocol data, or data associated with another application/service type or specific application/service or specific software/system, encrypted within the stream of packets. The signature identifies the Voice Over Internet Protocol data, or data associated with another application/service type or specific application/service or specific software/system, despite the encryption obscuring the contents of the stream of packets.

The exemplary embodiments may be used for all types of data. The exemplary embodiments, for example, may be used to specify the presence of on-line gaming sessions, simulations, virtual reality, email, messaging, multimedia-conferencing, application-sharing, e-voting, group-ware & collaboration, and any sort or type of video data. The exemplary embodiments can be applied to any encrypted stream which still contains observable parameters having some correlation to the type of data and/or the type of application/service and/or the specific application/service. The concepts described herein can help not just the type of data or application being used and communicating within the encrypted stream, but the concepts can also help identify the actual vendor-make, model, and version of a software application being used (e.g., Vendor A may use different packet sizes than Vendor B, and version 3 from Vendor A uses different interpacket timing than version 1 from Vendor A). Whenever an encrypted stream contains observable parameters, the exemplary embodiments described herein exploit any correlation to the observable parameters.

According to an embodiment, a system may include a communications module noting an observable parameter of an encrypted stream of packets. The parameter is observable despite encryption obscuring the contents of the encrypted stream of packets. The Communications Module compares the observable parameter to a threshold value or value range. The Communications Module infers Voice Over Internet Protocol data, or data associated with another application/service type or specific application/service or specific software/system, is contained within the encrypted stream of packets from the observable parameter. A signature for insertion into the encrypted stream of packets is then specified, and the signature identifies the Voice Over Internet Protocol data, or data associated with another application/service type or specific application/service or specific software/system, encrypted within the stream of packets. The signature identifies the Voice Over Internet Protocol data, or data associated with another application/service type or specific application/service or specific software/system, despite the encryption obscuring the contents of the stream of packets.

According to another of the embodiments, a computer program product may be used for specifying a signature for an encrypted Voice Over Internet Protocol stream of packets. This computer program product includes a communications module stored on a computer-readable medium. The communications module notes an observable parameter of an encrypted stream of packets. The parameter is observable despite encryption obscuring the contents of the encrypted stream of packets. The Communications Module compares the observable parameter to a threshold value or value range. The Communications Module infers Voice Over Internet Protocol data, or data associated with another application/service type or specific application/service or specific software/system, is contained within the encrypted stream of packets from the observable parameter. A signature for insertion into the encrypted stream of packets is then specified, and the signature identifies the Voice Over Internet Protocol data, or data associated with another application/service type or specific application/service or specific software/system, encrypted within the stream of packets. The signature identifies the Voice Over Internet Protocol data, or data associated with another application/service type or specific application/service or specific software/system, despite the encryption obscuring the contents of the stream of packets.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

These and other features, aspects, and advantages of the embodiments of the present invention are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, a signature is specified for insertion into an encrypted stream of packets. The signature identifies the type of data encrypted within the stream of packets. The signature, for example, identifies the contents of a packet and/or the stream despite the encryption obscuring the contents. The signature may then be inserted into the stream of packets so that downstream processes can more easily identify the contents and apply content-specific processing. The signature may also be communicated to other communications devices for self-identifying, or marking, communications.

Figure 1:
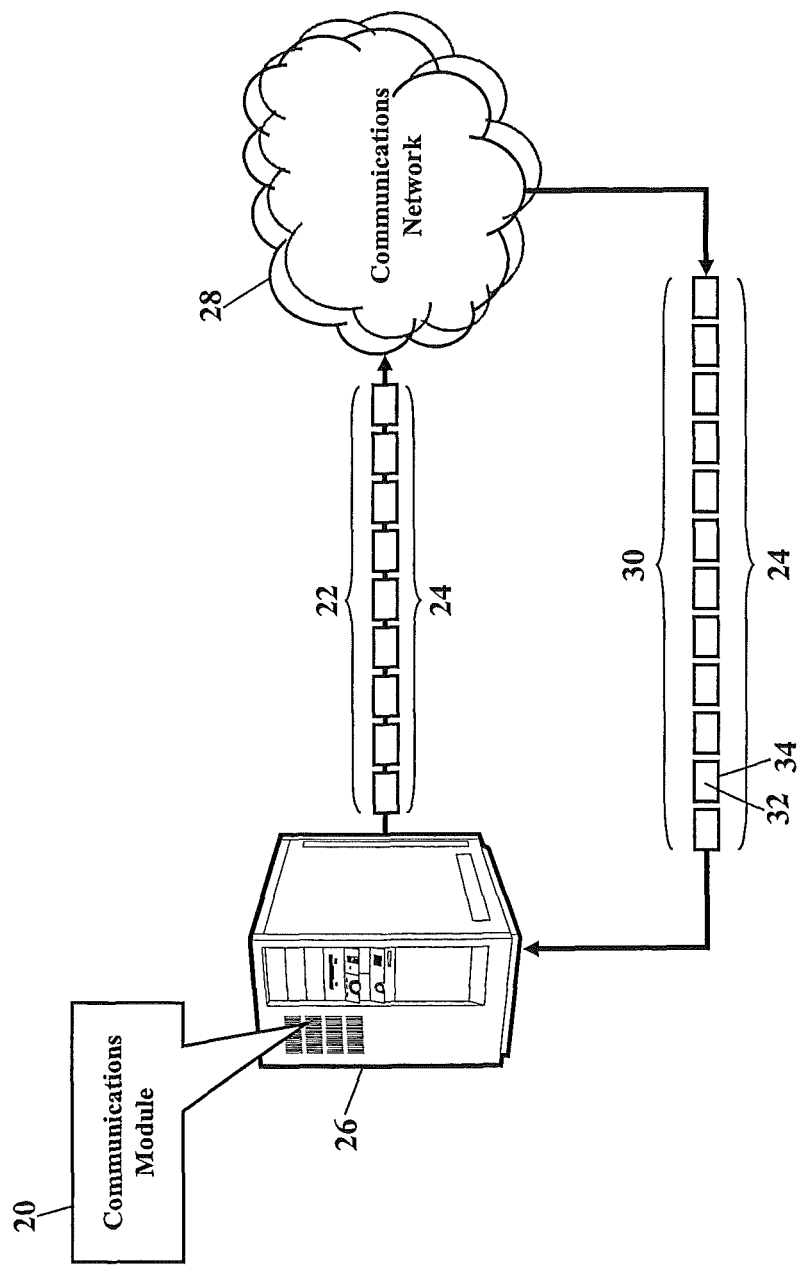
FIG. 1 is a schematic illustrating exemplary embodiments.

FIG. 1 is a schematic illustrating the exemplary embodiments. According to an exemplary embodiment, a communications module 20 comprises methods, systems, computer programs, and/or computer program products that help provide communications services. The communications module 20, in particular, specifies a signature 22 for insertion into an encrypted stream 24 of packets. The communications module 20 operates within any computer system, such as a communications server 26. The communications module 20 receives the encrypted stream 24 of packets via a communications network 28. Because the stream 24 of packets is encrypted, the encryption obscures the contents of the stream 24 packets. The Communications Module 20, however, is able to discern an observable parameter 30 of the encrypted stream 24 of packets. The Communications Module 20 is able to observe the parameter 30, despite encryption obscuring the contents 32 of each packet 34 within the stream 24 of packets. The Communications Module 20 then uses the observable parameter 30 to specify the signature 22. The signature 22 identifies the type of data encrypted within the stream 24 of packets. That is, the signature 22 identifies the type of data (e.g., video, picture, text, and/or or voice) contained within the contents 32 of each packet 34 within the stream 24 of packets. The signature 22 may then be inserted into the stream 24 of packets so that downstream processes can more easily identify the contents and apply content-specific processing. The signature may also be communicated via the communications network 28 to end points for marking communications.

Figure 2:
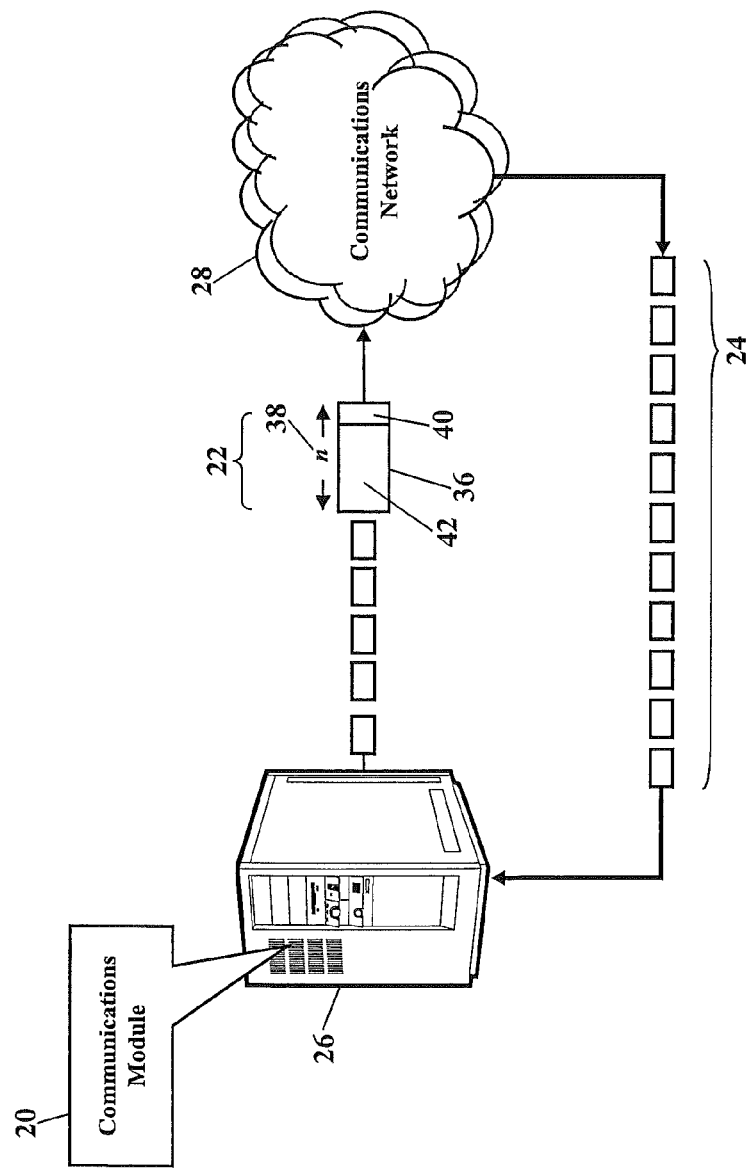
FIGS. 2 and 3 are schematics illustrating signature, according to the exemplary embodiments.
Figure 3:
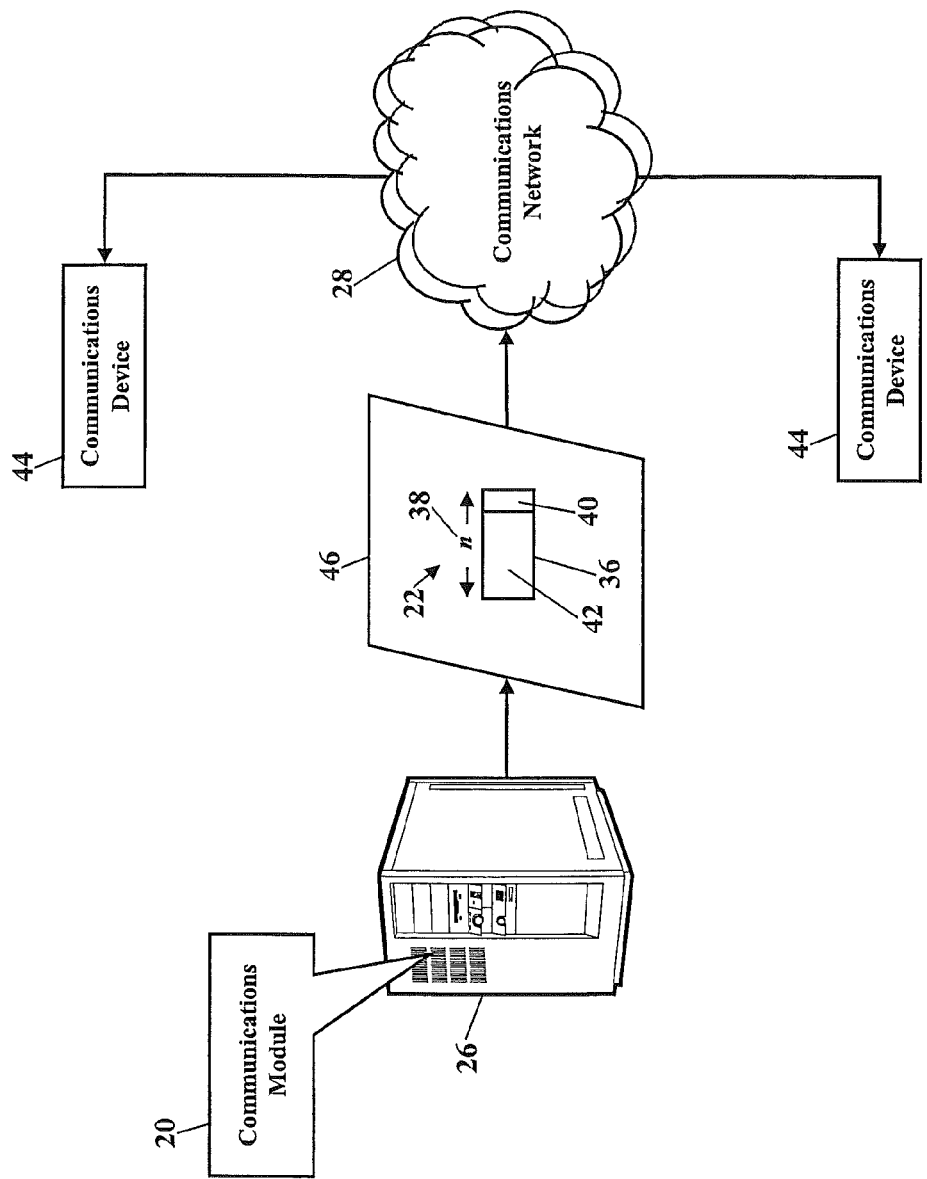

FIGS. 2 and 3 are schematics illustrating an exemplary signature 22. The communications module 20 receives the encrypted stream 24 of packets. Because the stream 24 of packets is encrypted, the encryption obscures the contents of the stream 22 packets. The Communications Module 20, however, is able to discern the observable parameter 30 of the encrypted stream 24 of packets. The Communications Module 20 is able to observe the parameter 30, despite encryption obscuring the contents 32 of each packet 34 within the stream 24 of packets. The Communications Module 20 then uses the observable parameter 30 to specify the signature 22. The signature 22 correlates to the observable parameter 30. That is, the signature 22 identifies the type of data encrypted within the stream 24 of packets. The signature 22 has some characteristic that uniquely identifies the type of data contained within the stream 24 of packets. As FIG. 2 illustrates, the signature 22 may include an insertion packet 36. The insertion packet 36 may have a size n (shown as reference numeral 38) that identifies the type of data contained within the stream 24 of packets. The insertion packet 36 is shown enlarged for clarity. The bit size n of the insertion packet 36 corresponds to what type of data is contained within an individual packet and/or within the entire stream 24 of packets. The size n of the insertion packet 36 may be divided between a header portion 40 and a payload portion 42. As FIG. 2 illustrates, the communications module 20 may then insert the insertion packet 36 into the stream 24 of packets. Although the insertion packet 36 is shown inserted at a beginning/front portion of the stream 24 of packets, the communications module 20 may additionally or alternatively insert the insertion packet 36 at any point within the stream 24 of packets. When the stream 24 of packets is then received by downstream processes, the downstream processes can read the unique bit size n and know the type of data contained within the stream 24 of packets. The downstream processes may thus determine whether they should act upon the stream 24 of packets, even though encryption obscures the contents of the stream 24 of packets.

FIG. 3 illustrates communication of the signature 22. Here the communications module 22 specifies the signature 22 and communicates the signature 22 to a communications device 44. FIG. 2 illustrated that the communications module 20 could insert the insertion packet 36 into the stream 24 of packets to denote the type of encrypted data. FIG. 3, however, illustrates that the communications module 20 may additionally or alternatively communicate the signature to other communications devices. The specifications for the signature 22 (such as the bit size n of the insertion packet 36) communicate in an electronic communication 46 to the communications device 44 via the communications network 28. When the communications device 44 receives the signature 22, the communications device 44 can then use the signature 22 to identify, or mark, further communications containing the same type of data. The communications module 20 thus instructs the communications device 44 to include the signature 22 with future communications having the same type of data. The communications module 20 thus instructs the communications device 44 to "self-identify" further encrypted packets and/or streams. The communications device 44 is instructed to self-identify the type of data contained within future encrypted packets and/or streams, all without compromising the privacy of the encrypted packets. The term "communications device" includes a computer, a personal digital assistant (PDA), a Global Positioning System (GPS) device, an interactive television, an Internet Protocol (IP) phone, a pager, a cellular/satellite phone, or any computer system and/or communications device utilizing a digital signal processor (DSP). The term "communications device" may also include watches, radios, vehicle electronics, clocks, printers, gateways, and other apparatuses and systems.

Figure 4:
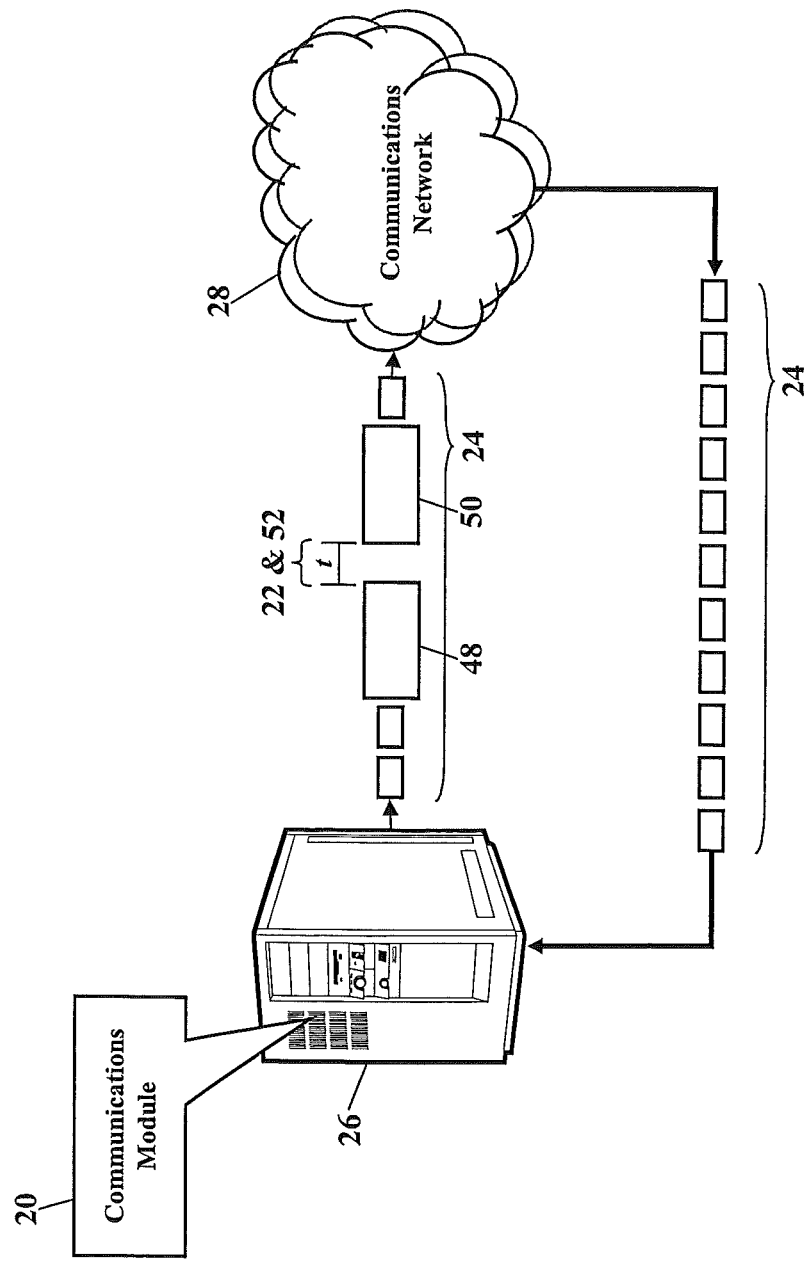
FIGS. 4-7 are schematics further illustrating the signature, according to more exemplary embodiments.

FIG. 4 is a schematic illustrating another signature 22, according to more exemplary embodiments. The communications module 20, as before, receives the encrypted stream 24 of packets. Although the stream 24 of packets is encrypted, the communications module 20 is able observe some characteristic that identifies the type of data contained within the stream 24 of packets. The communications module 20 then specifies the signature 22 to identify the type of data encrypted within the stream 24 of packets. As FIG. 4 illustrates, the signature 22 may include a timing interval t between adjacent packets 48 and 50 (the timing interval t is shown as reference numeral 52). The adjacent packets 48, 50 and the timing interval t are shown enlarged for clarity. The timing interval t corresponds to what type of data is contained within an individual packet and/or within the entire stream 24 of packets. As FIG. 4 illustrates, the communications module 20 may then advance and/or delay the adjacent packets 48, 50 to achieve the inter-packet timing interval t within the stream 24 of packets. The timing interval t may be specified between any adjacent packets within the stream 24 of packets, and the timing interval may occur once, periodically, or non-periodically. When the stream 24 of packets is then received by downstream processes, the downstream processes can read the timing interval t and know the type of data contained within the stream 24 of packets. The downstream processes may thus determine whether they should act upon the stream 24 of packets, even though encryption obscures the contents of the stream 24 of packets.

Figure 5:
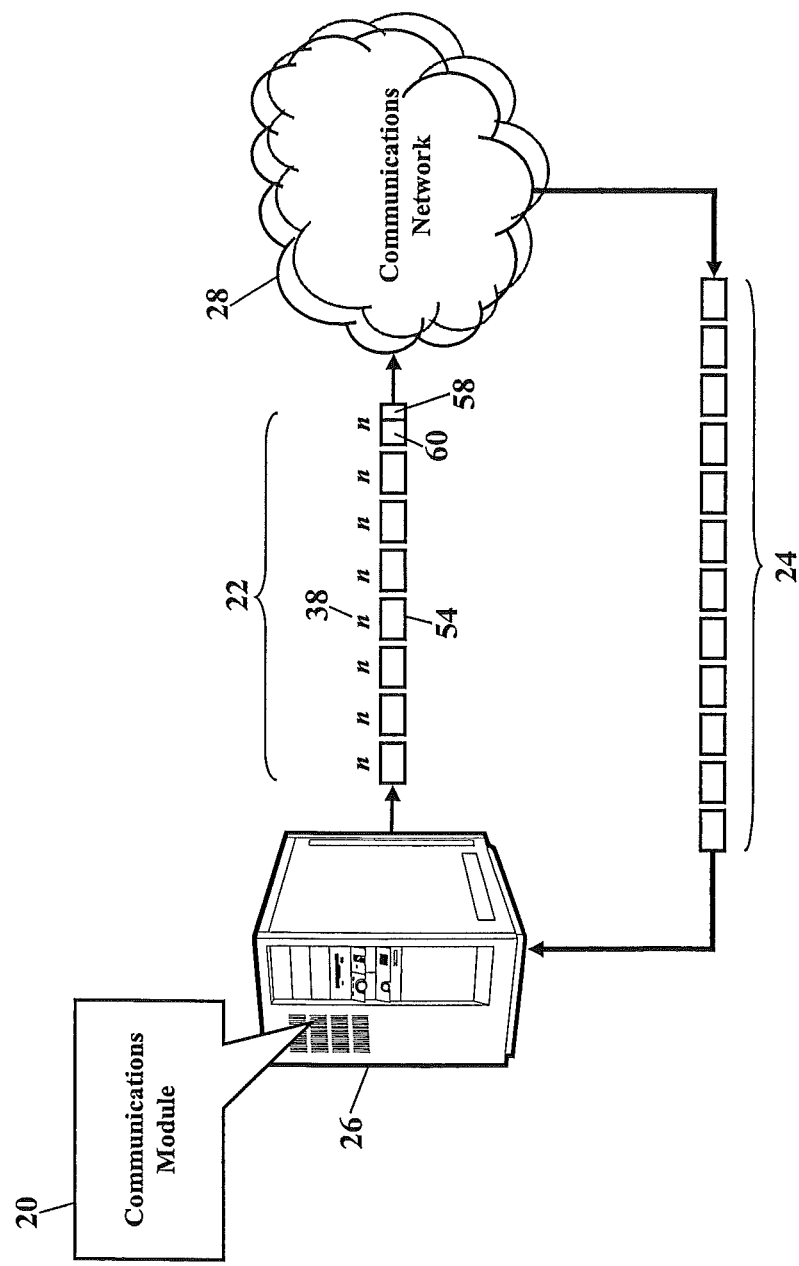

FIG. 5 is a schematic illustrating another signature 22, according to still more exemplary embodiments. Here the signature 22 comprises a constant, or nearly constant, bit size n for each packet 54 in the stream 24 of packets (the bit size n is shown as reference numeral 56). The size n for each packet 54 corresponds to the type of data encrypted within an individual packet and/or within the entire stream 24 of packets. The size n for each packet 54 may be divided between a header portion 58 and a payload portion 60. As FIG. 5 illustrates, the communications module 20 may then reconfigure the stream 24 of packets such that each packet is about the size n. Downstream processes can read the constant, or nearly constant, bit size n for each packet 54 and know the type of data contained within the stream 24 of packets.

Figure 6:
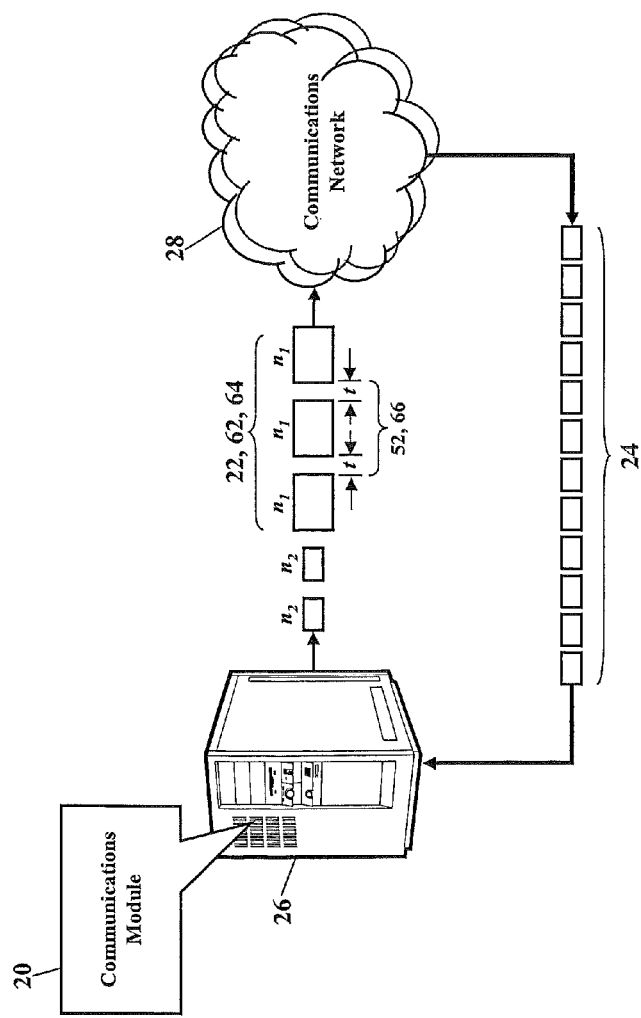

FIG. 6 is a schematic illustrating another signature 22, according to yet more exemplary embodiments. Here the signature 22 comprises a pattern 62 of packets. The pattern 62 of packets identifies the type of data encrypted within the stream 24 of packets. The pattern 62 may be any characteristic that can be observed despite the encryption. FIG. 6, as an example, shows the pattern 62 as a series 64 of three (3) identically-sized packets within the stream 24 of packets. Although the pattern 62 is shown at a beginning/front portion of the stream 24 of packets, the communications module 20 may additionally or alternatively specify the series 64 of identically-sized packets at any point within the stream 24 of packets. The series 64 of identically-sized packets is only one example of the pattern 62. The pattern 62 may be any characteristic, or combination of characteristics, that corresponds to the type of data encrypted within an individual packet and/or within the entire stream 24 of packets. The pattern 62 may be any series of nearly identically-sized packets, a series of incrementally increasing/decreasing packet sizes, and/or any series of packet sizes. The pattern 62 may occur once, periodically, or non-periodically. As FIG. 6 also shows, the pattern 62 may additionally or alternatively include a series 64 of three (3) identically-sized packets within the stream 24 of packets. The pattern 62 may additionally or alternatively include a series 66 of nearly identical intra-packet timing intervals t (shown again as reference numeral 52). The intra-packet timing intervals t may additionally or alternatively include a series of incrementally increasing/decreasing timing intervals and/or any series of timing intervals.

Figure 7:
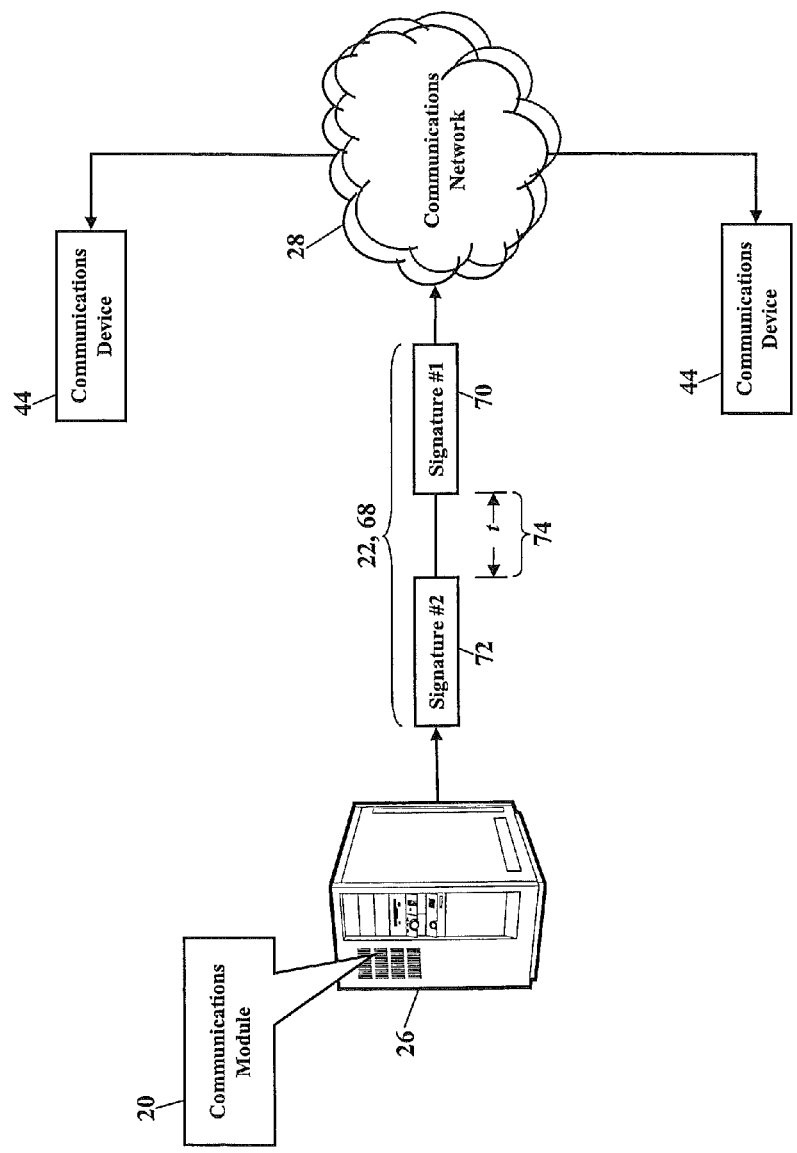

FIG. 7 is a schematic illustrating still another signature 22, according to more exemplary embodiments. Here the signature 22 periodically changes to thwart detection and hacking. A hacker or other unauthorized person might observe the signature 22 and attempt to copy. If, however, the signature 22 periodically changes, the signature is less exposed to hackers and unauthorized copying is more difficult. FIG. 7, then, illustrates a periodically changing signature 68. The communications module 20 specifies a first signature 70 and, after some time interval t, a second signature 72 is specified (the time interval t is shown as reference numeral 74). A different signature is specified with each time interval t. Because the signature 22 changes with each time interval t, potential hackers have only a limited amount of time to observe, learn, and copy each successive signature 22. As FIG. 7 also shows, the current signature 22 may also be communicated via the communications network 28. The most current signature 22 (such as the first signature 70) is provided to downstream processes and/or to the communications device 44 to mark their communications.

Figure 8:
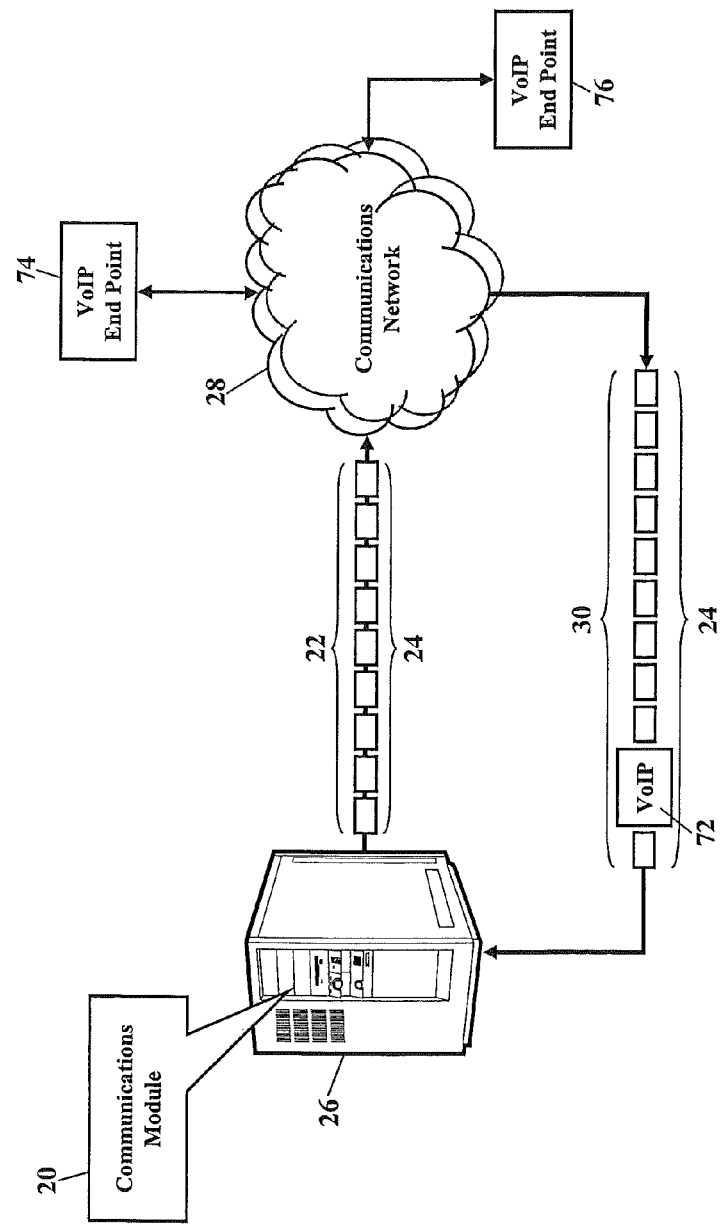
FIG. 8 is a schematic illustrating signature insertion for Voice Over Internet Protocol data, or data associated with another application/service type or specific application/service or specific software/system.

FIG. 8 is a schematic illustrating signature insertion for Voice Over Internet Protocol data, or data associated with another application/service type or specific application/service or specific software/system. Here the communications module 20 has determined that the encrypted stream 24 of packets contains Voice Over Internet Protocol (VoIP) data 72. The communications module 20 then specifies the signature 22 that corresponds to the Voice Over Internet Protocol (VoIP) data 72. The signature 22 may then be inserted into the stream 24 of packets so that downstream processes know to apply VoIP-specific processing (such as Quality of Service processing), or data associated with another application/service type or specific application/service or specific software/system, can be marked for processing, in threat the signature is inserted into the encrypted stream 24 at the endpoint. As FIG. 8 illustrates, VoIP end points 74 and 76 (engaged in a VoIP telephone call, for example) would add the signature 22 to their future VoIP communications. The VoIP end points 74 and 76, for example, might periodically insert "dummy" packets that exhibit the signature 22. The signature 22 identifies their communications as a VoIP communication, so that downstream processes can prioritize the packets for Quality of Service concerns.

Figure 9:
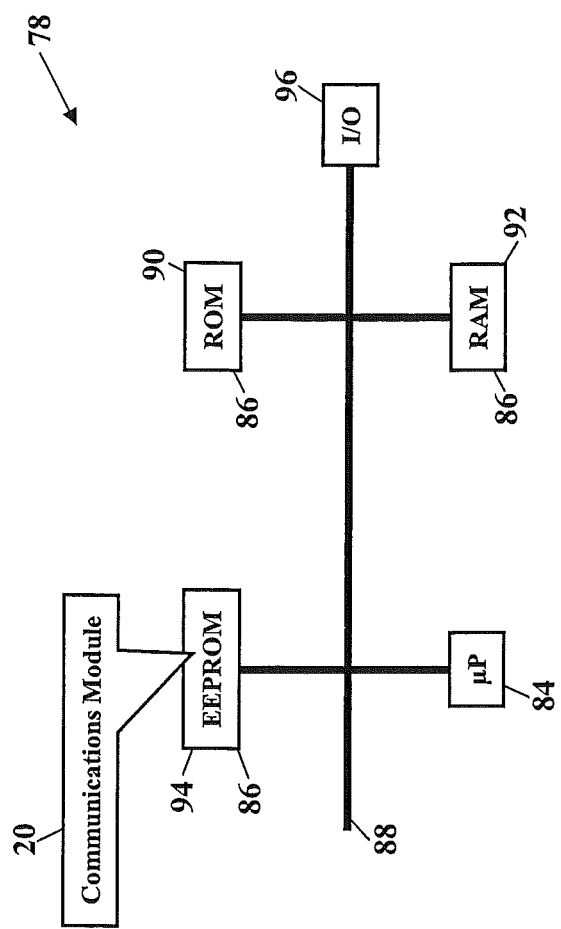
FIGS. 9-11 are schematics illustrating communications devices for signifying encrypted data types, according to the exemplary embodiments.
Figure 10:
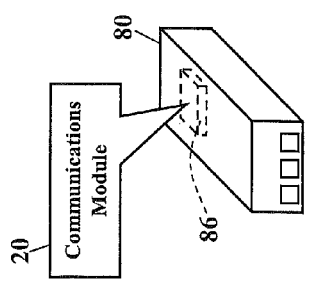
Figure 11:
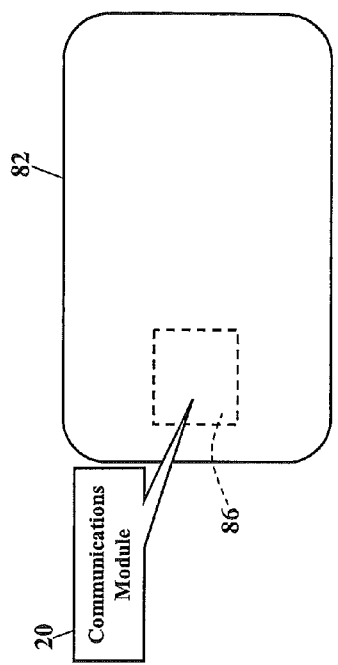

FIGS. 9-11 are schematics further illustrating various communications devices for identifying the type of data contained within encrypted streams of packets. These schematics illustrate that the exemplary embodiments may describe packetized communications conveyed over mobile networks. These mobile networks could include cellular networks, mobile networks using any of the I.E.E.E. 802 family of standards, and mobile networks using any portion of the electromagnetic spectrum (such as the Industrial, Scientific, and Medical band).

FIG. 9, for example, illustrates the exemplary embodiments may describe communications devices utilizing GSM networks. FIG. 9 is a block diagram of a Subscriber Identity Module 78, while FIGS. 10 and 11 illustrate, respectively, the Subscriber Identity Module 78 embodied in a plug 80 and the Subscriber Identity Module 78 embodied in a card 82. As those of ordinary skill in the art recognize, the Subscriber Identity Module 78 is used in conjunction with many communications devices (such as the communications device 44 shown in FIGS. 3, 7, and 8). The Subscriber Identity Module 78 stores user information (such as the user's International Mobile Subscriber Identity, the user's K.sub.i number, and other user information) and any portion of the communications module 20. As those of ordinary skill in the art also recognize, the plug 80 and the card 82 each interface with the communications device according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembe, Case, postale 56CH-1211 Geneva 20, Switzerland, Telephone +41 22 749 01 11, Telefax +41 22 733 34 30, www.iso.org).

FIG. 9 is a block diagram of the Subscriber Identity Module 78, whether embodied as the plug 80 of FIG. 10 or as the card 82 of FIG. 11. Here the Subscriber Identity Module 78 comprises a microprocessor 84 (.mu.P) communicating with memory modules 86 via a data bus 88. The memory modules may include Read Only Memory (ROM) 90, Random Access Memory (RAM) and or flash memory 92, and Electrically Erasable-Programmable Read Only Memory (EEPROM) 94. The Subscriber Identity Module 78 stores some or all of the communications module 20 in one or more of the memory modules 86. FIG. 9 shows the communications module 20 residing in the Erasable-Programmable Read Only Memory 94, yet the communications module 20 could alternatively or additionally reside in the Read Only Memory 90 and/or the Random Access/Flash Memory 92. An Input/Output module 96 handles communication between the Subscriber Identity Module 78 and the communications device. Because Subscriber Identity Modules are well known in the art, this patent will not further discuss the operation and the physical/memory structure of the Subscriber Identity Module 78. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 12:
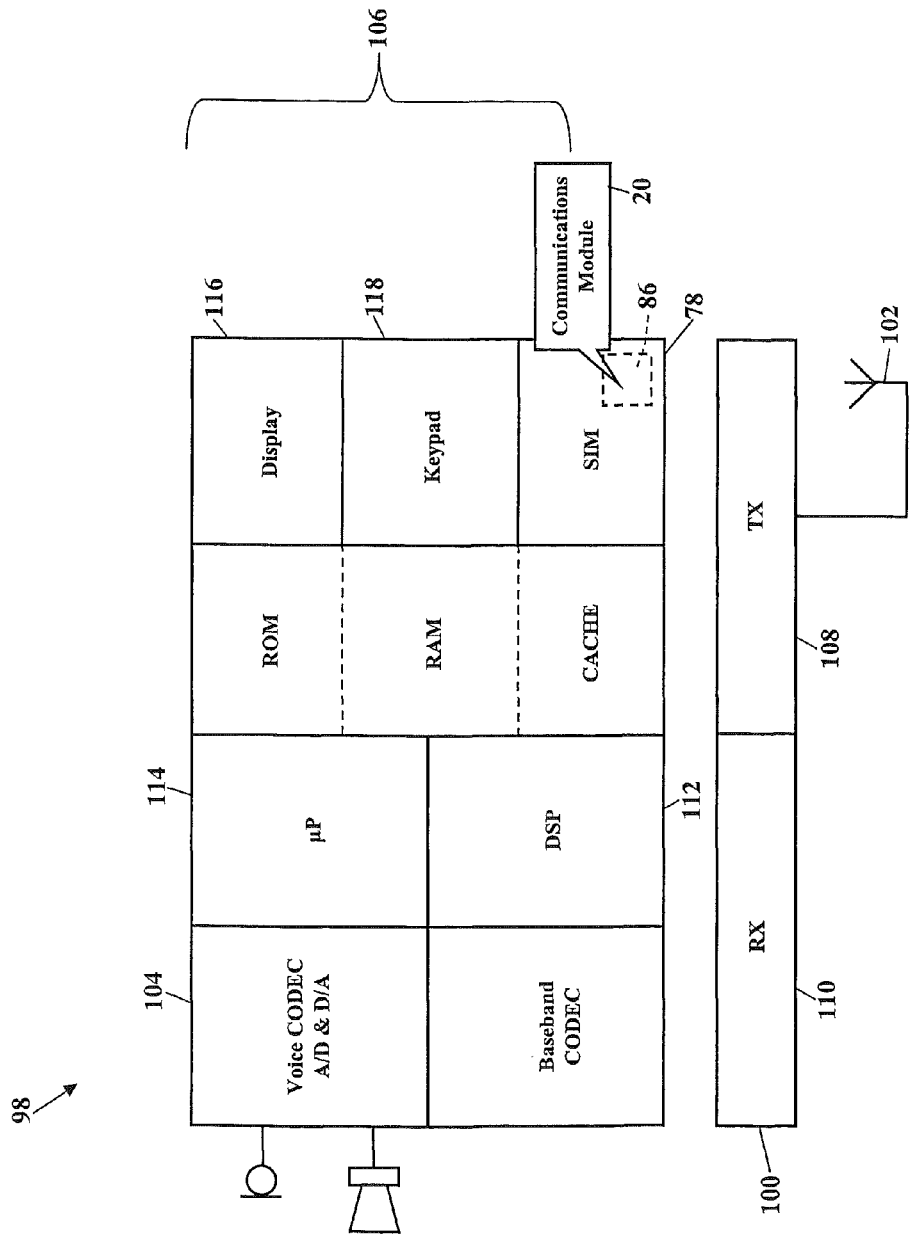
FIG. 12 is a schematic further illustrating communications devices for signifying encrypted data types, according to the exemplary embodiments.

FIG. 12 is a schematic further illustrating various communications devices for identifying the type of encrypted data according to the exemplary embodiments. FIG. 12 is a block diagram of another communications device 98 utilizing the communications module 20 of this invention. Here the communications device 98 comprises a radio transceiver unit 100, an antenna 102, a digital baseband chipset 104, and a man/machine interface (MMI) 106. The transceiver unit 100 includes transmitter circuitry 108 and receiver circuitry 110 for receiving and transmitting signals. The transceiver unit 100 couples to the antenna 102 for converting electrical current to and from electromagnetic waves. The digital baseband chipset 104 contains a digital signal processor (DSP) 112 and performs signal processing functions for audio signals, data signals, digital signals, and/or RF signals. As FIG. 12 shows, the digital baseband chipset 104 may also include an on-board microprocessor 114 that interacts with the man/machine interface (MMI) 106. The man/machine interface (MMI) 106 may comprise a display device 116, a keypad 118, and the Subscriber Identity Module 78. The on-board microprocessor 114 performs GSM protocol functions and control functions for the radio circuitry 108 and 110, for the display device 116, and for the keypad 118. The on-board microprocessor 114 may also interface with the Subscriber Identity Module 78 and with the communications module 20 residing in the memory module 86 of the Subscriber Identity Module 78. Because the functional architecture of the communications device 98 is well known to those of ordinary skill in the art, the communications device 98 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The communications device 98 receives the signature 22. When the communications module 20 specifies the signature 22, the communications module 20 communicates that signature to the communications device 98. When the communications device 44 receives the signature 22, the communications device 98 can then use the signature 22 to identify, or mark, further communications containing the same type of data. The communications module 20 thus instructs the communications device 98 to include the signature 22 with future communications having the same type of data. The communications module 20 thus instructs the communications device 98 to "self-identify" further packets and/or streams. The communications device 98 is instructed to self-identify the type of data contained within future packets and/or streams, all without compromising the privacy of the encrypted packets.

This invention may be applied to any signaling standard. As those of ordinary skill in the art recognize, FIGS. 9-12 illustrate a Global System for Mobile (GSM) communications device. That is, the communications device utilizes the Global System for Mobile (GSM) communications signaling standard. Those of ordinary skill in the art, however, also recognize the exemplary embodiments may include any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. The exemplary embodiments may also describe any communications device that receives packetized communications via a telecommunications softswitch.

This invention may also be applied to any packet scheme. The exemplary embodiments mostly mention the Internet Protocol packet scheme, only because this scheme is perhaps most familiar. Those of ordinary skill in the art, however, recognize that this invention is equally applicable to any packet scheme. This invention, in fact, is independent of the packet scheme and, thus, may be applied to any packet schemes.

Figure 13:
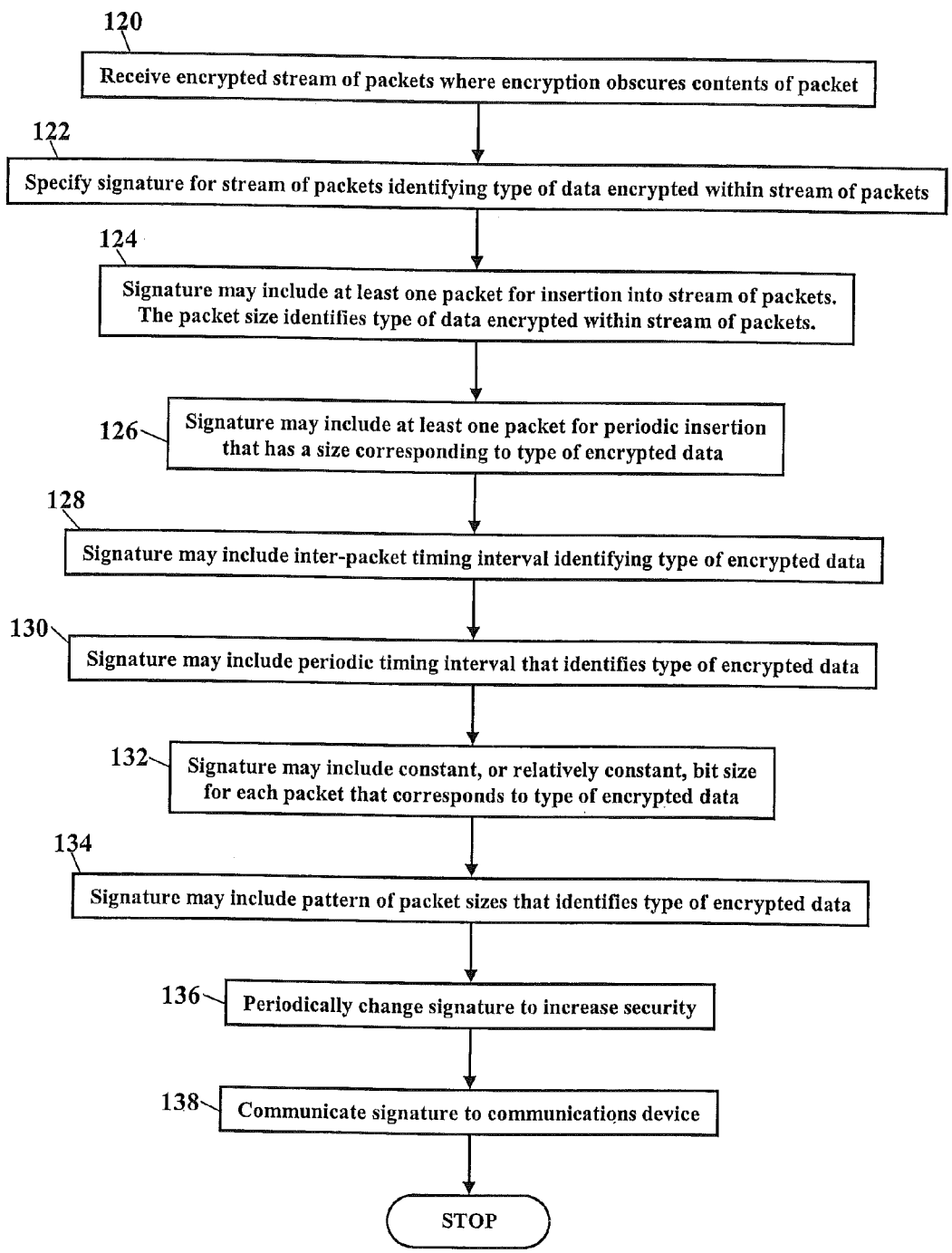
FIG. 13 is a flowchart illustrating a method of specifying a signature for an encrypted stream of packets.

FIG. 13 is a flowchart illustrating a method of specifying a signature for an encrypted stream of packets. The encrypted stream of packets is received (Block 120), and encryption obscures the contents of a packet. A signature is specified for the stream of packets (Block 122). The signature identifies a type of data encrypted within the stream of packets. The signature may include at least one packet for insertion into the stream of packets (Block 124). The packet has a size that identifies the type of data encrypted within the stream of packets. The signature may also additionally or alternatively include at least one packet for periodic insertion into the stream of packets (Block 126), where the packet again has a size corresponding to the type of encrypted data. The signature may additionally or alternatively include an inter-packet timing interval identifying the type of data encrypted within the stream of packets (Block 128). The signature may also include a periodic timing interval that identifies the type of encrypted data (Block 130). The signature may additionally or alternatively include a constant, or relatively constant, bit size for each packet in the stream of packets (Block 132), and the bit size corresponds to the type of encrypted data. The signature may additionally or alternatively include a pattern of packet sizes (Block 134), where the pattern identifies the type of data encrypted within the stream of packets. The signature may be periodically changed (Block 136) to increase security. The signature may also be communicated to a communications device (Block 138).

Figure 14:
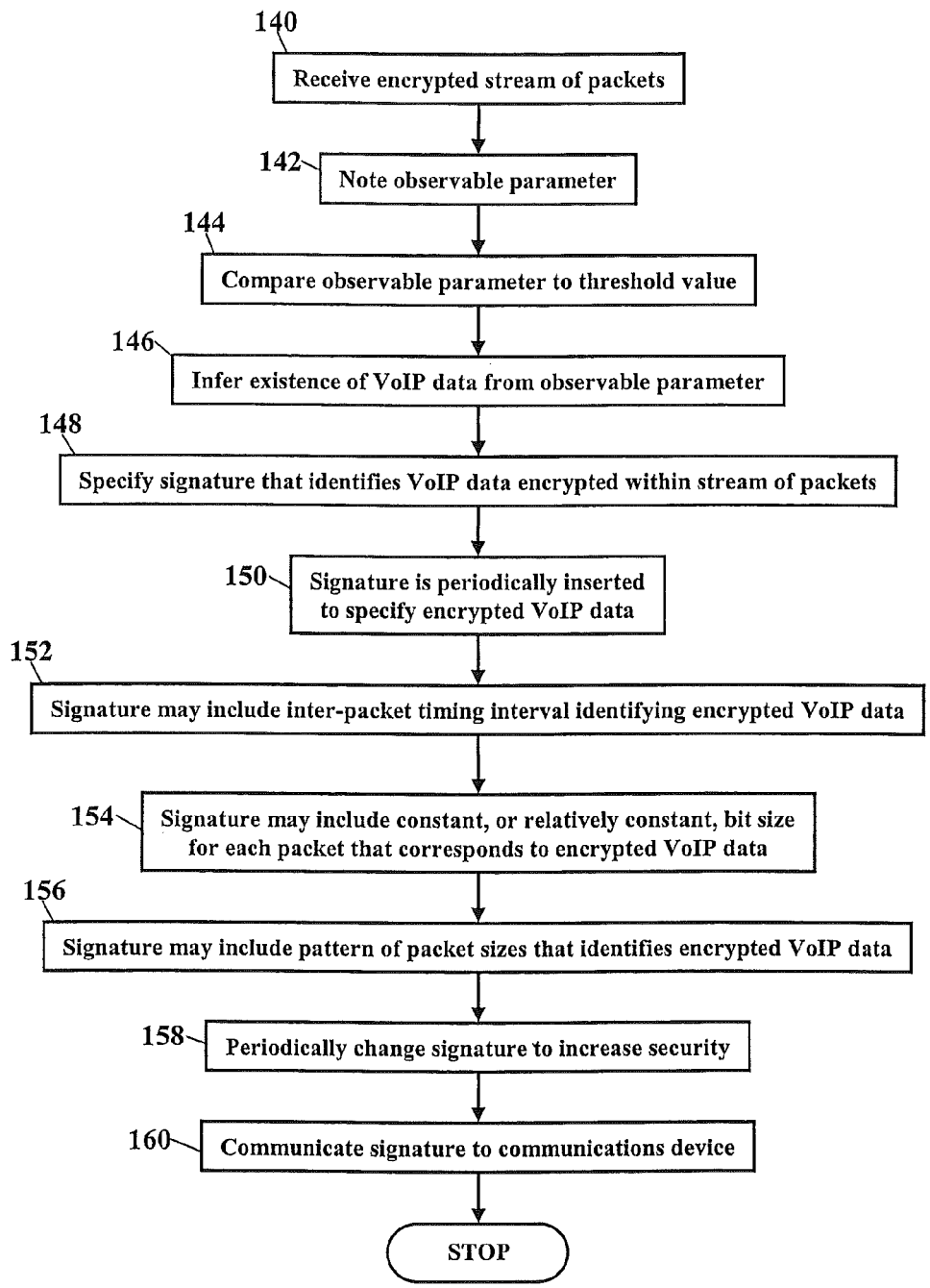
FIG. 14 is a flowchart illustrating a method of specifying a signature for encrypted Voice Over Internet Protocol data, or data associated with another application/service type or specific application/service or specific software/system.

FIG. 14 is a flowchart illustrating a method of identifying Voice Over Internet Protocol data, or data associated with another application/service type or specific application/service or specific software/system. An encrypted stream of packets is received (Block 140). An observable parameter of the encrypted stream of packets is noted (Block 142). The parameter is observable despite encryption obscuring the contents of the encrypted stream of packets. The observable parameter is compared to a threshold value (Block 144) or value range and the existence of Voice Over Internet Protocol data, or data associated with another application/service type or specific application/service or specific software/system, is inferred from the observable parameter (Block 146). A signature for insertion into the stream of packets is specified (Block 148), and the signature identifies the encrypted Voice Over Internet Protocol data, or data associated with another application/service type or specific application/service or specific software/system, present within the stream of packets. The signature may be specified for periodic insertion into the stream of packets (Block 150). The signature may include a timing interval between at least two encrypted packets (Block 152) and/or a size for each packet in the stream of packets (Block 154). The signature may also include a pattern of packet sizes that identifies the stream of packets as containing the Voice Over Internet Protocol data (Block 156), or data associated with another application/service type or specific application/service or specific software/system. The signature may be periodically changed (Block 158), and the signature may be communicated to a communications device (Block 160).

The communications module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the communications module to be easily disseminated. A computer program product for specifying a signature for an encrypted stream of packets includes the communications module stored on the computer-readable medium. The communications module notes an observable parameter of an encrypted stream of packets. The parameter is observable despite encryption obscuring the contents of the encrypted stream of packets. The Communications Module compares the observable parameter to a threshold value or value range. The Communications Module infers Voice Over Internet Protocol data, or data associated with another application/service type or specific application/service or specific software/system, is contained within the encrypted stream of packets from the observable parameter. A signature for insertion into the encrypted stream of packets is then specified, and the signature identifies the Voice Over Internet Protocol data, or data associated with another application/service type or specific application/service or specific software/system, encrypted within the stream of packets. The signature identifies the Voice Over Internet Protocol data, or data associated with another application/service type or specific application/service or specific software/system, despite the encryption obscuring the contents of the stream of packets.

The communications module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
    receiving an encrypted stream of packets, wherein data included in the encrypted stream of packets is obscured by encryption;
    specifying a signature for the encrypted stream of packets;
    identifying an application type of the data included in the encrypted stream of packets using the signature, wherein the receiving, specifying and identifying are performed on at least one processor; and
    communicating the signature to a communications device;
    wherein the signature is based on one of size of the packets and timing between the packets;
    wherein specifying the signature comprises specifying a packet for time-based insertion into the encrypted stream of packets, the packet having a size that identifies the application type of the data and not comprising data of the application type; and
    wherein specifying the signature comprises establishing a pattern of packet sizes.

2. A method according to claim 1, wherein specifying the signature comprises establishing the size for each of the packets in the encrypted stream of packets included in the encrypted stream of packets, the size for each packet identifying the application type of the data.

3. A method according to claim 1, further comprising changing the signature.

4. A method according to claim 1, further comprising specifying the signature as identifying Voice Over Internet Protocol data as the application type of the data included in the encrypted stream of packets.

5. A method according to claim 1 wherein specifying the signature comprises establishing a pattern of timing intervals between the packets included in the encrypted stream of packets, the pattern of the timing intervals identifying the application type of the data included in the encrypted stream of packets.

6. A method according to claim 1, wherein specifying the signature comprises establishing a periodic timing interval between two of the packets included in the encrypted stream of packets, the periodic timing interval identifying the application type of the data.

7. A system, comprising:
    a processor; and
    a memory device comprising computer readable program code on the memory device that when executed by the process causes the processor to perform operations comprising:
    receiving an encrypted stream of packets, wherein data included in the encrypted stream of packets is obscured by encryption;
    specifying a signature for the encrypted stream of packets;
    identifying an application type of the data included in the encrypted stream of packets using the signature, wherein the receiving, specifying and identifying are performed on at least one processor; and
    communicating the signature to a communications device;
    wherein the signature is based on one of size of the packets and timing between the packets;
    wherein specifying the signature comprises specifying a packet for time-based insertion into the encrypted stream of packets, the packet having a size that identifies the application type of the data and not comprising data and wherein specifying the signature comprises establishing a pattern of packet sizes.

8. A system according to claim 7, wherein specifying the signature comprises establishing the size for each of the packets in the encrypted stream of packets included in the encrypted stream of packets, the size for each packet identifying the application type of the data.

9. A system according to claim 7, wherein the operations further comprise changing the signature.

10. A system according to claim 7, wherein the operations further comprise specifying the signature as identifying Voice Over Internet Protocol data as the application type of the data included in the encrypted stream of packets.

11. A system according to claim 7, wherein specifying the signature comprises establishing a pattern of timing intervals between the packets included in the encrypted stream of packets, the pattern of the timing intervals identifying the application type of the data included in the encrypted stream of packets.

12. A system according to claim 7, wherein specifying the signature comprises establishing a periodic timing interval between two of the packets included in the encrypted stream of packets, the periodic timing interval identifying the application type of the data.

13. A computer program product, comprising:
a non-transitory computer readable medium comprising computer readable program code that when the computer readable program code is executed by a processor causes the processor to perform operations comprising:
receiving an encrypted stream of packets, wherein data included in the encrypted stream of packets is obscured by encryption;
specifying a signature for the encrypted stream of packets;
identifying an application type of the data included in the encrypted stream of packets using the signature, wherein the receiving, specifying and identifying are performed on at least one processor; and
communicating the signature to a communications device;
wherein the signature is based on one of size of the packets and timing between the packets;
wherein specifying the signature comprises specifying a packet for time-based insertion into the encrypted stream of packets, the packet having a size that identifies the application type of the data and not comprising data of the application type; and
wherein specifying the signature comprises establishing a pattern of packet sizes.

14. A computer program product according to claim 13, wherein the operations further comprise specifying a signature as identifying Voice Over Internet Protocol as the application type of the data included in the encrypted stream of packets.

15. A computer program product according to claim 13, wherein specifying the signature comprises establishing a pattern of timing intervals between the packets included in the encrypted stream of packets, the pattern of the timing intervals identifying the application type of the data included in the encrypted stream of packets.

16. A computer program product according to claim 13, wherein specifying the signature comprises establishing a periodic timing interval between two of the packets included in the encrypted stream of packets, the periodic timing interval identifying the application type of the data.

* * * * *

UNITED STATES PATENT AND TRADEMARK OFFICE
CERTIFICATE OF CORRECTION

PATENT NO. : 8,868,906 B2  
APPLICATION NO. : 13/681066  
DATED : October 21, 2014  
INVENTOR(S) : Aaron et al.

Page 1 of 1

It is certified that error appears in the above-identified patent and that said Letters Patent is hereby corrected as shown below:

In the Claims:
Column 12, Claim 7, Lines 66 and 67:
  Please correct "and not comprising data and"
    to read -- and not comprising data of the application type; and --

Signed and Sealed this
Thirty-first Day of March, 2015

Michelle K. Lee
*Director of the United States Patent and Trademark Office*